United States Patent [19]

Byrn et al.

[11] Patent Number: 5,761,716
[45] Date of Patent: Jun. 2, 1998

[54] RATE BASED MEMORY REPLACEMENT MECHANISM FOR REPLACING CACHE ENTRIES WHEN THE CACHE IS FULL

[75] Inventors: Jonathan William Byrn; Gary Scott Delp, both of Rochester; Kevin Gerard Plotz, Byron, all of Minn.

[73] Assignee: International Business Machines Corporation, Armonk, N.Y.

[21] Appl. No.: 640,605

[22] Filed: May 1, 1996

[51] Int. Cl.⁶ .................................................. G06F 13/00
[52] U.S. Cl. ................ 711/133; 711/118; 711/135; 711/136; 711/141; 364/DIG. 1
[58] Field of Search ................................ 711/118, 133, 711/135, 136, 141

[56] References Cited

U.S. PATENT DOCUMENTS

| | | | |
|---|---|---|---|
| 4,873,629 | 10/1989 | Harris et al. | 364/200 |
| 4,905,141 | 2/1990 | Brenza | 364/200 |
| 4,969,088 | 11/1990 | McAuliffe et al. | 395/200.03 |
| 5,113,514 | 5/1992 | Albonesi et al. | 395/471 |
| 5,148,537 | 9/1992 | Belsan | 395/425 |
| 5,155,825 | 10/1992 | Moughanni et al. | 395/425 |
| 5,235,692 | 8/1993 | Ayres et al. | 395/425 |
| 5,241,666 | 8/1993 | Idleman et al. | 395/425 |
| 5,386,538 | 1/1995 | Nye | 395/425 |
| 5,502,833 | 3/1996 | Byrn et al. | 395/459 |
| 5,592,432 | 1/1997 | Vishlitzky et al. | 365/230.03 |
| 5,606,688 | 2/1997 | McNutt et al. | 395/497.01 |

FOREIGN PATENT DOCUMENTS 604310A  6/1994  European Pat. Off. ........ G06F 12/12

OTHER PUBLICATIONS

IBM Technical Disclosure Bulletin, AT893-0715, S.P.Song, vol. 37, No. 12, Dec. 1994, "Dual On-Chip Instruction Cache Organization in High Speed Processors", pp. 213-214.

IBM Technical Disclosure Bulletin, vol. 37, No. 06B, Jun. 1994, "Cache Optimized Structure Supporting Global Object Locks", pp. 11-18.

*Primary Examiner*—Frank J. Asta
*Attorney, Agent, or Firm*—Owen J. Gamon

[57] ABSTRACT

A rate based mechanism for determining which data to replace in a cache when the cache is full. The computer system processes data, which are associated with multiple channels or processes. These channels or processes have different, cyclic rates. When the cache is full, the system chooses the data to replace by selecting the data block in the cache that has the lowest rate and is the most recently used.

17 Claims, 15 Drawing Sheets

```
Time slices
         0000000000111111111122222222223333333333444444444455555555556666666667
         1234567890123456789012345678901234567890123456789012345678901234567890 1
Access
Rate1    1111111111111111111111111111111111111111111111111111111111111111111111
Rate2    2 2 2 2 2 2 2 2 2 2 2 2 2 2 2 2 2 2 2 2 2 2 2 2 2 2 2 2 2 2 2 2 2 2 2
Rate3    3  3  3  3  3  3  3  3  3  3  3  3  3  3  3  3  3  3  3  3  3  3  3
Rate4    4   4   4   4   4   4   4   4   4   4   4   4   4   4   4   4   4
Rate5    5    5    5    5    5    5    5    5    5    5    5    5    5    5
```

FIG. 1

| Channel | Rate |
|---------|------|
| A | 1 |
| B | 1 |
| C | 2 |
| D | 2 |
| E | 3 |
| F | 3 |
| G | 4 |
| H | 4 |
| I | 5 |
| J | 5 |

FIG. 2

| | 01 | 02 | 03 | 04 | 05 | 06 | 07 | 08 | 09 | 10 | 11 | 12 | 13 |
|---|---|---|---|---|---|---|---|---|---|---|---|---|---|
| New Access | | G H I J | I J A B | A B C D | A B E F | A G B H C D | A B I J | A E B F C D | C A D B E F | E F A B | C D G H | A B E F | C D I J | I J A B |
| Starting Cache Contents (LRU) | AEI BFJ CG DH | X X X X | G A H B I J | I A J B A C B D | A B C D | A B E F | A G B H C D | A B I J | A E B F C D | E F A B | C D G H | A B E F | C D I J |
| #Misses / #Access | 10/10 | 2/2 | 2/4 | 2/4 | 2/4 | 4/6 | 4/4 | 4/6 | 2/2 | 4/6 | 4/4 | 4/4 | 4/6 | 2/2 |

Miss Rate of 34/46 or 73.9%
(Discounting the initial misses)

FIG. 3

RATE BASED MEMORY REPLACEMENT MECHANISM FOR REPLACING CACHE ENTRIES WHEN THE CACHE IS FULL

FIELD OF THE INVENTION

This invention relates to the field of information processing systems. More particularly, this invention relates to a rate based memory management system for use in an information processing system.

BACKGROUND

A computer system stores data in its memory. Data can be computer executable instructions and control structures used to operate the computer or information of importance to a user of the computer. In order to do useful work, the computer system operates on and performs manipulations against this data; for example, the computer system might add two pieces of data together or compare two pieces of data to determine which is larger. Ideally, a computer system would have a singular, indefinitely large and very fast memory, in which any particular data would be immediately available to the computer system. In practice this has not been possible because memory that is very fast is also very expensive. Thus, computers typically have a hierarchy (or levels) of memory, each level of which has greater capacity than the preceding level but which is also slower with a less expensive per unit cost. These levels of the hierarchy may form a subset of one another, that is, all data in one level may also be found in the level below, and all data in that lower level may be found in the one below it, and so on until we reach the bottom of the hierarchy. In order to minimize the performance penalty that the hierarchical memory structure introduces, it is desirable to store the most frequently used data in the fastest memory and the least frequently used data in the slowest memory.

For example, a computer system might contain:

1) a very small, very fast, and very expensive cache that contains the most frequently used data;

2) a small, fast, and moderately expensive RAM Random Access Memory) that contains all the data in the cache plus the next most frequently used data; and 3) a large, slow, inexpensive disk drive that contains all the data in the computer system.

In order to determine which data should be placed in the faster memory, for example in the cache or RAM, the computer system may predict which data will be frequently used. In order to predict use frequency, computer systems have typically used the theory of "temporal locality of reference": recently used data is likely to be used again soon.

When the computer system needs a piece of data, it looks first in the cache. If the data is not in the cache, the computer system retrieves the data from a lower level of memory, such as RAM or a disk drive, and places the data in the cache. If the cache is already full of data, the computer system must determine which data to remove from the cache in order to make room for the data currently needed. One removal method is for the computer system to replace the data that has been unused for the longest time. This exploits a corollary of temporal locality: if recently used data is likely to be used again, then the best candidate for removal is the least recently used data. Thus, one method for replacing data in fast memory is the Least Recently Used (LRU) method.

The LRU method only yields good computer system performance when the "temporal locality of reference" theory holds true; that is, in situations where the recently used data is actually likely to be used again soon. If the temporal locality of reference theory does not hold true, then the LRU method performs poorly. When data access is cyclic, the temporal locality of reference theory does not hold true, and poor performance can result because the LRU method may discard the data from the cache that is actually the most likely to be used next.

An example of cyclic data access is when the data is associated with processes in the computer system that have different priorities. One computer system can simultaneously support multiple users who have different performance needs, so the data access of these processes will occur at different, cyclic rates. To illustrate, interactive computer processes that support customer service representatives who take orders over the telephone from customers might have the highest priority. Interactive computer processes that support order entry from mail orders might have a medium priority. Batch jobs that print out reports of the previous day's order activity might have the lowest priority. Since these processes operate at different priority levels, they will access their respective data at different, cyclic rates.

Another example of cyclic data access is when the data is associated with communication channels that have different transfer rates. Systems that support the transport protocol known as Asynchronous Transfer Mode (ATM) are capable of sending different types of signals simultaneously on multiple channels that have different transfer rates. For example, audio, video, and electronic mail could each have their own channel and would be transferred between systems at different rates because talking on the telephone and watching a movie are inherently more time sensitive than is sending data in an electronic mail message.

For the foregoing reasons, there is a need for a memory replacement mechanism that accounts for and gives good performance when data access is cyclic.

SUMMARY OF THE INVENTION

It is an object of the present invention to provide an enhanced cache memory management system.

It is a further object to provide an enhanced cache memory management system that uses a data rate based cache replacement mechanism.

It is a further object to provide an enhanced cache memory management mechanism that uses a lowest data rate, most recently used cache replacement mechanism in a virtual memory system.

These and other objects are achieved by the computer system that uses a rate based mechanism for determining which data to replace in a cache when the cache is full. The computer system processes data, which are associated with multiple channels or processes. These channels or processes have different, cyclic rates. When the cache is full, the system chooses the data to replace by selecting the data block in the cache that has the lowest rate and is the most recently used.

BRIEF DESCRIPTION OF THE DRAWINGS

FIG. 1 is a prior art timing diagram that shows the data access patterns associated with processing data at 5 different cyclic rates.

FIG. 2 is a prior art table that shows the mapping of 10 channels to the 5 different rates of FIG. 1.

FIG. 3 is prior art table that shows the Least Recently Used cache replacement patterns for the channels of FIG. 2 when processing data having the cyclic rates of FIG. 1.

DESCRIPTION OF THE PREFERRED EMBODIMENT

Figure 4:
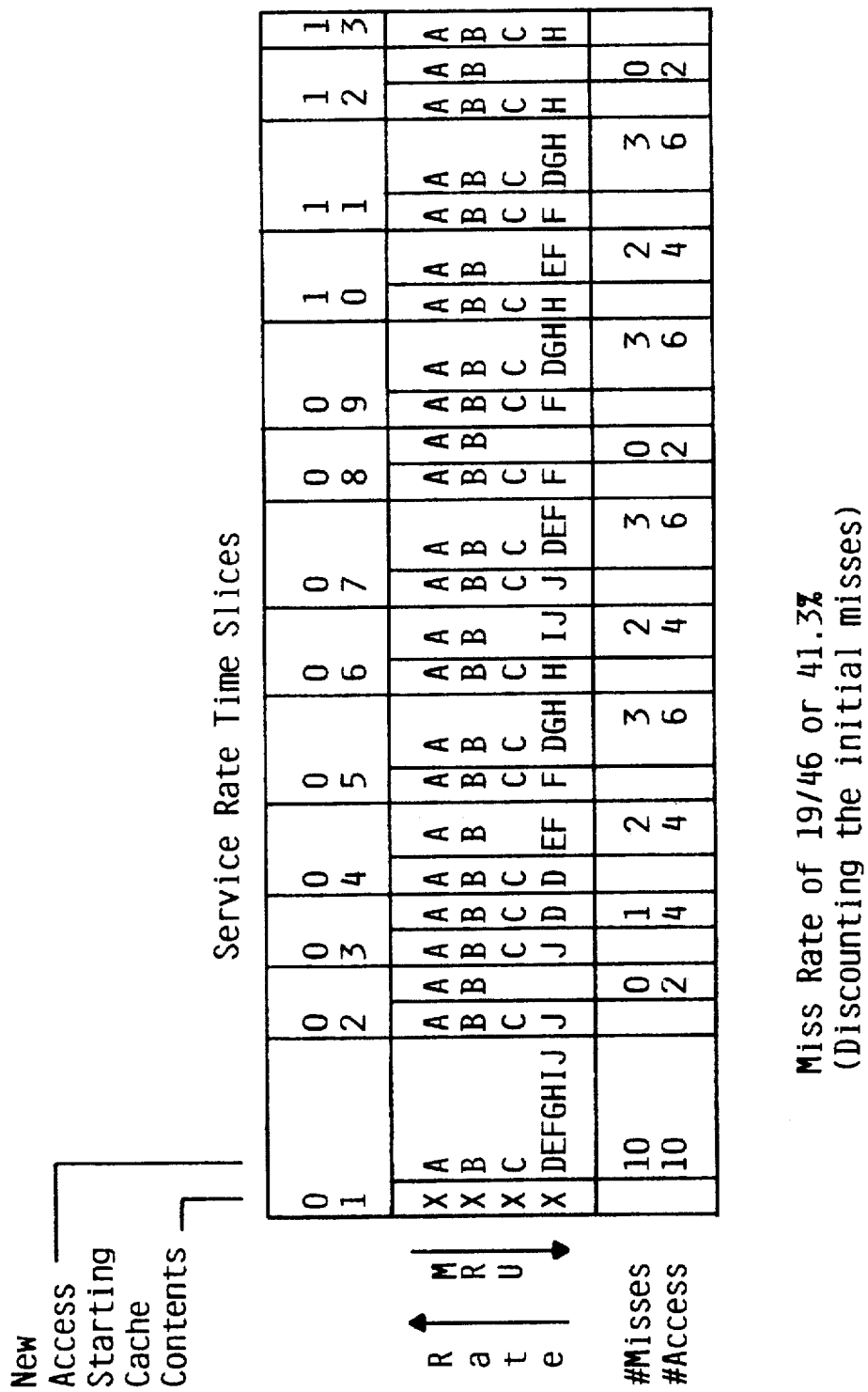
FIG. 4 is a table that shows the cache replacement pattern for the Lowest Rate, Most Recently Used mechanism, according to the preferred embodiment.

These and other objects are achieved by the computer system that uses a rate based mechanism for determining which data to replace in a cache when the cache is full. The computer system processes data, which are associated with multiple channels or processes. These channels or processes have different, cyclic rates. When the cache is full, the system chooses the data to replace by selecting the data block in the cache that has the lowest rate and is the most recently used.

Figure 2:
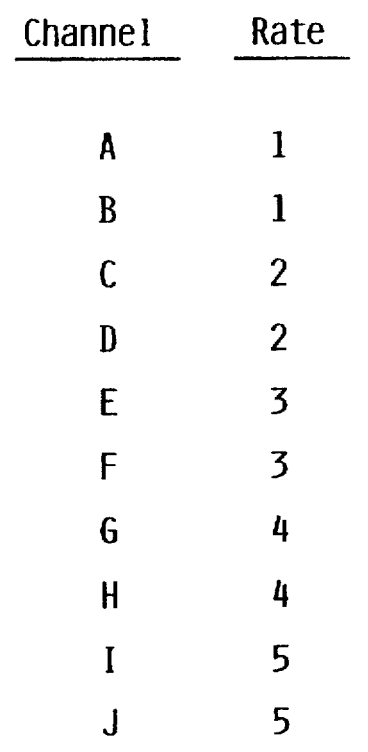

FIG. 1 is a prior art timing diagram that shows the data access patterns for 5 different rates, rates 1 through 5, which represent the rates at which data is transferred through the 10 channels A–J shown in the table of FIG. 2. A channel represents a data stream that flows across a transmission line to and from a computer system. The ten channels, A through J, have rates 1 through 5 as shown in FIG. 2. Rate 1 is the highest and rate 5 is the lowest. Referring again to FIG. 1, the service times are indicated in time slices from 01 to 71. Data at rate 1 is transferred at every time slice. Data at rate 2 is transferred every second time slice. Data at rate 3 is transferred every third time slice. Data at rate 4 is transferred every fourth time slice, and data at rate 5 is transferred every fifth time slice. Thus, at time 01, all channels transmit data. At time 02 only the channels with rate 1 transmit data. At time 03, channels with rates 1 and 2 transmit data. At time 04, channels with rates 1 and 3 transmit data. At time 05, channels with rates 1, 2, and 4 transmit data. At time 06, channels with rates 1 and 5 transmit data. At time 07, channels with rates 1, 2, and 3 transmit data, and so on.

FIG. 3 is prior art table that shows the Least Recently Used cache replacement patterns for the channels of FIG. 2 when processing data having the cyclic access rates of FIG. 1. The cache is in a computer system attached to the channels. The cache has four entries in a set, is 4-way set associative, and uses a Least Recently Used cache replacement algorithm. A through J represent the page tables associated with the data from channels A through J respectively. It is these page tables that are swapped in and out of the cache. The page tables are used to map logical to physical memory addresses in a virtual memory system. The cache contents are ordered in FIG. 3 with the least recently used contents at the top and the most recently used contents at the bottom.

At time slice 01, the cache is empty, represented by the four "X", and all ten channels, A–J transmit data. Since all ten channels transmit data, the computer system accesses all ten page tables associated with the ten channels. Since the cache is empty, none of the ten page tables are in the cache, so there are ten cache misses.

At time slice 02, the cache contains the page tables associated with channels G, H, I, and J, since these were the last channels to transmit data at time 01. Channels A and B transmit data, so there are two cache accesses. Since neither of the page tables associated with channels A and B are in the cache, there are two cache misses.

At time slice 03, the cache contains the page tables associated with channels I, J, A, and B. The page tables associated with channels A and B replaced the page tables associated with channels G and H during time slice 02 because G and H were the least recently used data in the cache. Channels A, B, C, and D transmit data. There are four accesses because four channels transmitted data. There are two cache misses because the page tables associated with A and B were in the cache, but C and D were not.

Since I and J are the least recently used page tables in the cache, they are replaced by the page tables for C and D, and the cache contents becomes A, B, C, D at time slice 04. Channels A, B, E, and F transmit data. Since four channels transmitted data, there are four cache accesses. Since the page tables associated with channels A, and B are in the cache, but the page tables associated with channels E and F are not, there are two cache misses.

Since C and D are the least recently used page tables in the cache, they are replaced by the page tables for E and F, and the cache contents becomes A, B, E, and F at time slice 05. Six channels, A, B, C, D, G, and H transmit data, so there are six cache accesses. Since the page tables associated with A and B are in the cache and the others are not, there are four cache misses.

Since A, B, E, and F were all the least recently used page tables in the cache, they are replaced and the cache contents becomes C, D, G, and H at time slice 06. Four channels, A, B, I, and J transmit data at time slice 06, so there are four cache accesses. Since none of these page tables are in the cache, there are four caches misses.

Since C, D, G, and H were the least recently used page tables, they are replaced, and the cache contents becomes A, B, I, J at time slice 07. Six channels A, B, C, D, E, and F transmit data at time slice 07, so there are six cache accesses. Since the page tables associated with A and B are in the cache and the others are not, there are four cache misses.

Since A, B, I, and J are the least recently used page tables in the cache, they are replaced and the cache contents becomes C, D, E, F at time slice 08. Two channels, A and B, transmit data at time slice 08, so there are two cache accesses. Since neither the page tables associated with channels A nor B are in the cache, there are two cache misses.

Since C and D were the least recently used page tables, they are replaced, and the cache contents becomes E, F, A, and B at time slice 09. Six channels, A, B, C, D, G, and H transmit data, so there are six cache accesses. Since A and B are in the cache and the others are not, there are four cache misses.

Since the page tables associated with E, F, A, and B are the least recently used, they are replaced, and the cache contents becomes C, D, G, and H at time slice 10. Four channels, A, B, E, and F transmit data, so there are four cache accesses. Since none of A, B, E, or F are in the cache, there are four cache misses.

Since the page tables associated with C, D, G, and H are least recently used, they are replaced and the cache contents becomes A, B, E, and F at time slice 11. Six channels, A, B, C, D, I, and J transmit data, so there are six cache accesses. Since A and B are in the cache and the others are not, there are four cache misses.

Since the page tables associated with A, B, E, and F are least recently used, they are replaced, and the cache contents becomes C, D, I, and J at time slice 12. Two channels A and B transmit data, so there are two cache accesses. Since neither the page tables associated with channels A nor B are in the cache, there are two cache misses. Since the page tables associated with channels C and D are least recently used, the cache contents becomes I, J, A, and B at time slice 13. The cycle shown in FIG. 3 repeats itself after 60 time slices.

Adding the number of cache misses (discarding the initial misses) yields 34. Adding the cache accesses yields 46. 34/46 yields a cache miss rate of 73.9%. Generally, as the number of channels to be serviced grows, the miss rate increases towards 100% and the cache becomes useless. When the miss rate approaches 100%, using the cache can often be worse than turning the cache off.

FIG. 4 is a table that shows the cache access pattern for the Lowest Rate, Most Recently Used cache block replacement mechanism, according to the preferred embodiment, using the same cyclic data rates as shown in FIG. 1. The lowest rate, most recently used mechanism is more fully described in the flowcharts of FIGS. 7 and 8. The cache contents are sorted in FIG. 4 from top to bottom first by rate and then by use. Thus, the highest rate channels are at the top and the lowest rate channels are at the bottom. When two adjacent channels have the same rate, they are sorted with the least recently used being toward the top and the most recently used being toward the bottom. The cache is in a computer system attached to the channels. The cache has four entries in a set and is 4-way set associative. A through J represent the page tables associated with the data from channels A through J respectively. It is these page tables that are swapped in and out of the cache. The page tables map logical to physical addresses in a virtual memory system.

At time slice 01 the cache is empty, represented by the four "X", and all ten channels A-J transmit data. Since all ten channels transmit data, the computer system accesses all ten page tables associated with the ten channels. Since the cache is empty, none of the ten page tables are in the cache, so there are ten cache misses.

At time slice 02, the cache contains the page tables associated with channels A, B, C, and J. Since the cache was initially empty, page tables A, B, C, and D were initially inserted into the cache because the cache had a free entry when they arrived. When page table E arrived, the cache contained A, B, C, and D. E replaced page table D because although both C and D had the lowest rate in the cache (rate 2 as opposed to rate 1 for A and B), D was most recently used. When page table F arrived, the cache contained A, B, C and E. E had the lowest rate in the cache (rate 3), so F replaced E, and the cache contents became A, B, C, and F. Page table G replaced F because F had the lowest rate (rate 3), and the cache contents became A, B, C, and G. Page table H replaced G because G had the lowest rate in the cache (rate 4), and the cache contents became A, B, C, and H. Page table I replaced H because H had the lowest rate in the cache (rate 4), and the cache contents became A, B, C, and I. Page table J replaced I because I had the lowest rate in the cache (rate 5). At time slice 02, channels A and B transmit data, so there are two cache accesses. Since both page tables associated with channels A and B are in the cache, there are zero cache misses.

At time slice 03, the cache still contains the page tables associated with A, B, C and J. Four channels A, B, C and D transmit data, so there are four cache accesses. There is one cache miss because the page tables associated with A, B, and C were in the cache, but D was not.

Since channel J has the lowest rate in the cache its page table is replaced by the page table for channel D, and the cache contents becomes A, B, C, and D at time slice 04. Channels A, B, E, and F transmit data. Since four channels transmitted data, there are four cache accesses. Since the page tables associated with channels A, and B are in the cache, but the page tables associated with channels E, and F are not, there are two cache misses.

Since D and E are the lowest rate, most recently used page tables in the cache, they are replaced by the page tables for E and then F respectively, and the cache contents becomes A, B, C, and F at time slice 05. Six channels, A, B, C, D, G, and H transmit data, so there are six cache accesses. Since the page tables associated with A, B, and C are in the cache and the others are not, there are three cache misses.

Since F, D, and G are the lowest rate, most recently used page tables in the cache, they are replaced by D, then G, and then H, respectively, and the cache contents becomes A, B, C, and H at time slice 06. Four channels, A, B, I, and J transmit data at time slice 06, so there are four cache accesses. Since the page tables associated with channels A and B are in the cache and the others are not, there are 2 cache misses.

Since H and I are the lowest rate, most recently used page tables in the cache, they are replaced by I and then J, respectively, and the cache contents becomes A, B, C, and J at time slice 07. Six channels A, B, C, D, E, and F transmit data at time slice 07, so there are six cache accesses. Since the page tables associated with A, B, and C are in the cache and the others are not, there are three cache misses.

Since J, D, and E, are the lowest rate, most recently used page tables in the cache, they are replaced by D, E, and then F, respectively, and the cache contents becomes A, B, C, and F at time slice 08. Two channels, A and B, transmit data at time slice 08, so there are two cache accesses. Since both the page tables associated with channels A and B are in the cache, there are zero cache misses.

Since there were zero cache misses at time slice 08, the cache contents remains A, B, C, and F at time slice 09. Six channels, A, B, C, D, G, and H transmit data, so there are six cache accesses. Since A, B, and C are already in the cache and the others are not, there are three cache misses.

Since the page tables associated with F, D, and G are the lowest rate, most recently used blocks in the cache, they are replaced by D, then G, and then H, respectively, and the cache contents becomes A, B, C, and H at time slice 10. Four channels, A, B, E, and F transmit data, so there are four cache accesses. Since A and B are already in the cache and E and F are not, there are two cache misses.

Since the page tables associated with H and E are lowest rate, most recently used blocks in the cache, they are replaced by E and then F, respectively, and the cache contents becomes A, B, C, and F at time slice 11. Six channels, A, B, C, D, G, and H transmit data, so there are six cache accesses at time slice 11. Since the page tables associated with channels A, B, and C are in the cache and D, G, and H are not, there are three cache misses.

Since the page tables associated with F, D and G are the lowest rate, most recently used blocks in the cache, they are replaced by D, then G, and then H, respectively, and the cache contents becomes A, B, C, and H at time slice 12. Two channels A and B transmit data, so there are two cache accesses. Since both of the page tables associated with channels A and B are in the cache, there are zero cache misses, and the cache contents remains A, B, C, and H at time slice 13. The cycle shown in FIG. 4 repeats itself after 60 time slices.

Adding the number of cache misses (discarding the initial misses) yields 19. Adding the cache accesses yields 46. 19/46 yields a cache miss rate of 41.3%, which is far superior to the cache miss rate of 73.9% for the least recently used mechanism of FIG. 3.

Figure 5A:
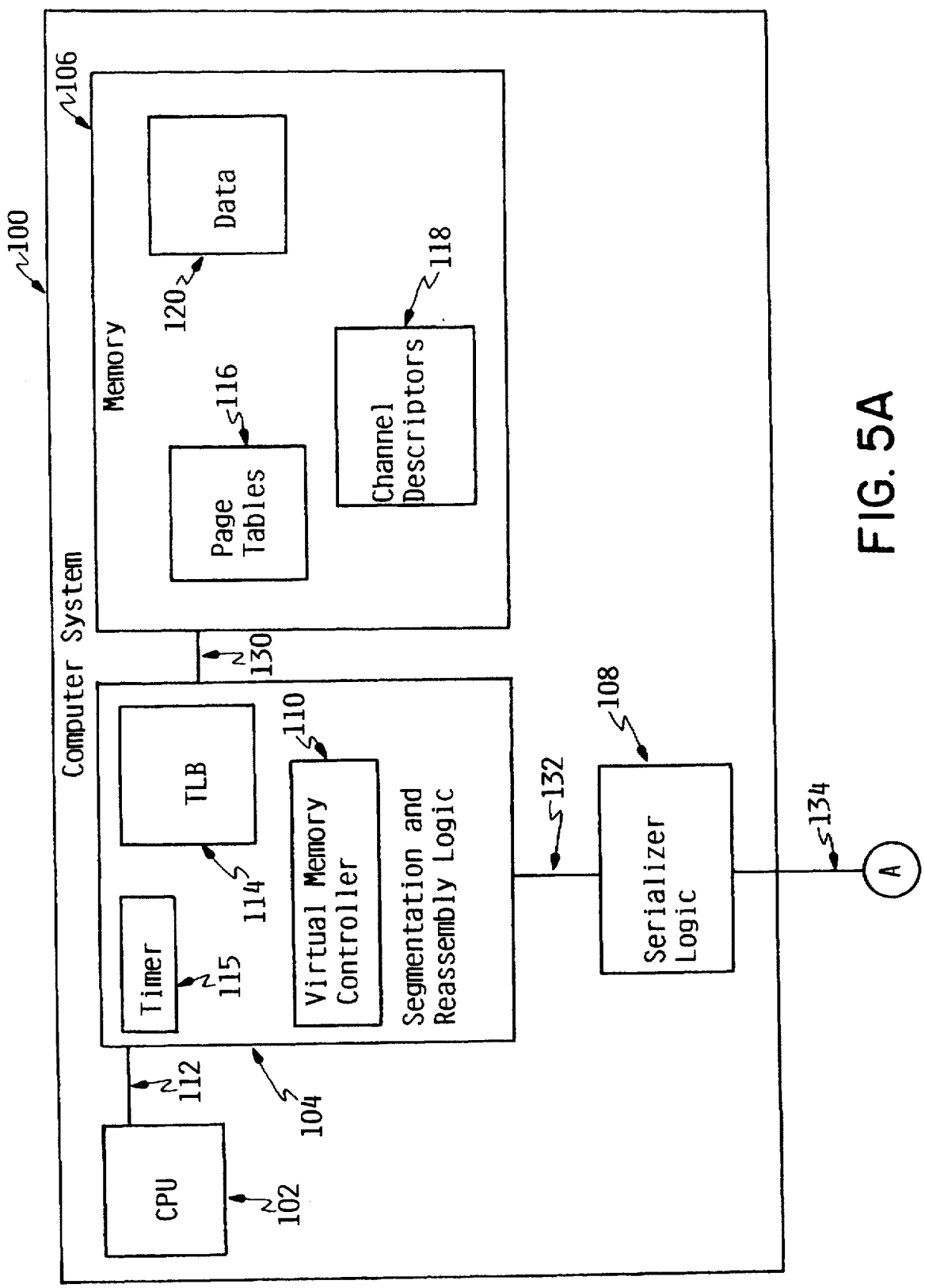
FIG. 5 is a block diagram of an exemplary computer system, according to the preferred embodiment.
Figure 5B:
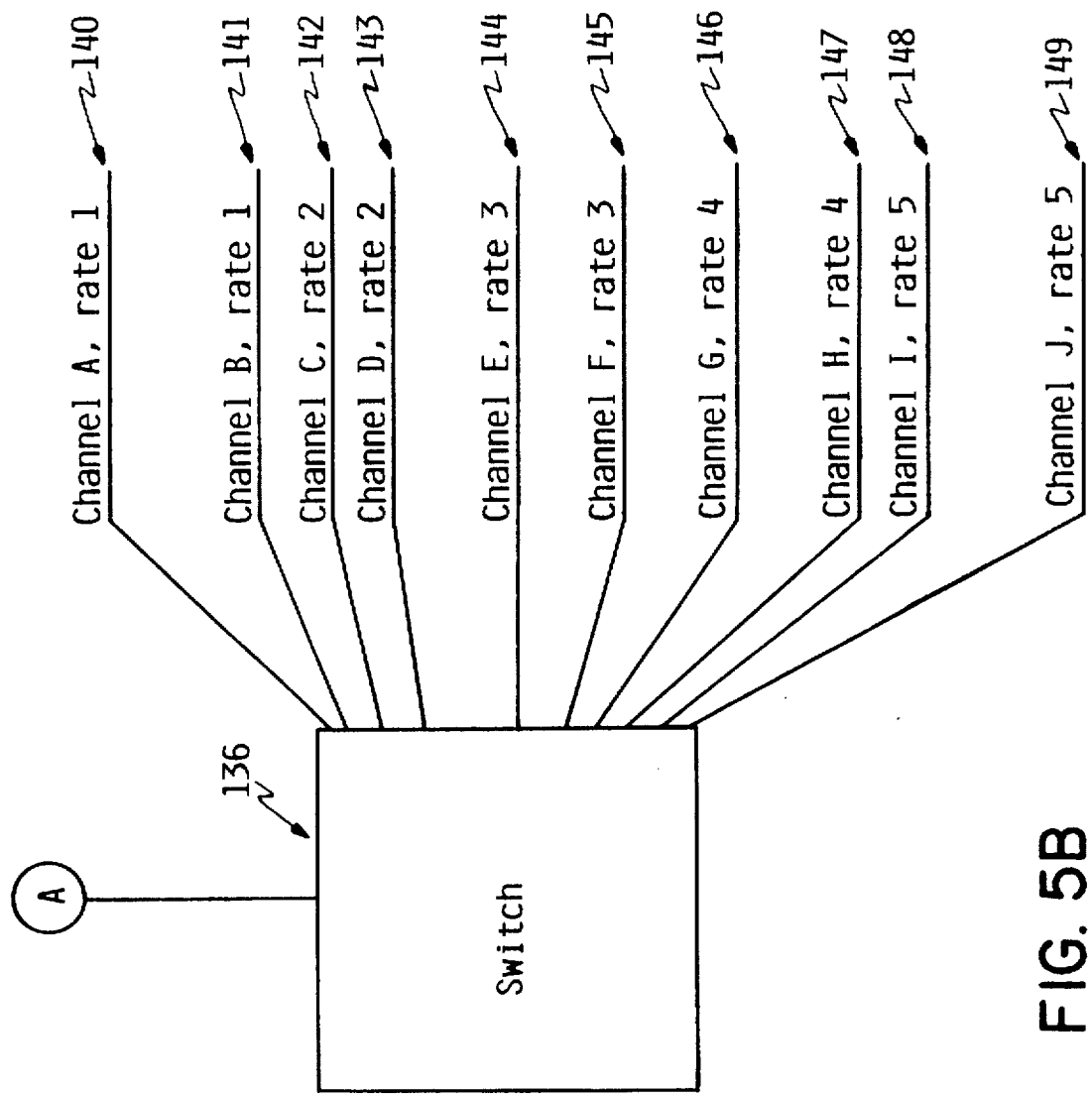

FIG. 5 shows a block diagram of an exemplary computer system, according to the preferred embodiment. Computer system 100 contains central processing unit (CPU) 102 connected to segmentation and reassembly (SAR) logic 104 via system bus 112. SAR 104 is connected to memory 106 via memory bus 130 and to serializer logic 108 via serializer bus 132. Computer system 100 is connected to switch 136 via communications line 134 connected to serializer logic 108.

SAR 104 contains timer 115, virtual memory manager 110, and translation lookaside buffer (TLB) 114. Timer 115 is a clock. The operation of virtual memory manager 110 is more fully described in the flowcharts of FIGS. 7 and 8. In the preferred embodiment, virtual memory manager 110 is custom control logic, but it could also be implemented as instructions in memory capable of being executed on CPU 102.

Memory 106 is a dynamic random access memory (DRAM) sufficiently large to hold the necessary data structures. While memory 106 is shown as a single entity, memory 106 may in fact comprise a plurality of modules and may exist at multiple levels, from high-speed registers and caches to lower speed but larger DRAM chips. Memory 106 contains page tables 116, channel descriptors 118, and data 120.

Page tables 116 are data structures that virtual memory controller 110 uses to translate virtual memory addresses to physical page addresses. Page tables 116 are necessary because SAR 104 uses a virtual memory system. Page tables 116 are indexed by virtual page number and contain physical page addresses. In order to access the contents of data 120, virtual memory controller 110 must first translate a memory virtual address to a memory physical address. When virtual memory controller 110 needs to access the contents of data 120, it transfers the contents of page table 116 between memory 106 and Translation Lookaside Buffer (TLB) 114. TLB 114 is thus a cache for the virtual to physical address translation found in page table 116. The contents of TLB 114 are more fully described in FIG. 6.

Channel descriptors 118 contain rate information for channels 140-149. Data 120 is the data that is transferred between channels 140-149 and computer system 100.

Switch 136 multiplexes multiple channels into a single data stream on communications line 134 to serializer logic 108. Ten channels, A-J are shown. Channel A 140 transmits data at rate 1. Channel B 141 also transmits data at rate 1. Channel C 142 transmits data at rate 2. Channel D 143 also transmits data at rate 2. Channel E 144 transmits data at rate 3. Channel F 145 also transmits data at rate 3. Channel G 146 transmits data at rate 4. Channel H 147 also transmits data at rate 4. Channel I 148 transmits data at rate 5. Channel J 149 also transmits data at rate 5. Although 10 channels with 5 rates are shown in this example, any number of channels and any combinations of rates could occur.

In the preferred embodiment, computer system 100 is an IBM AS/400 computer. Computer system 100 could also be another type of computer system, whether it be an IBM PS/2 personal computer, an Apple Macintosh, or a mainframe computer such as an IBM System/390, and still fall within the spirit and scope of this invention. In addition, computer system 100 could be a microcomputer such as described above but connected to a larger computer system such as an IBM AS/400. It will be readily appreciated that the principles of the invention may apply to other computer applications, such as other minicomputers, mainframes, network servers, supercomputers, personal computers, or workstations, as well as other electronics applications. Therefore the invention should not be limited to the particular hardware or software designs, performance, and testing parameters, or application-specific functions disclosed herein.

Figure 6A:
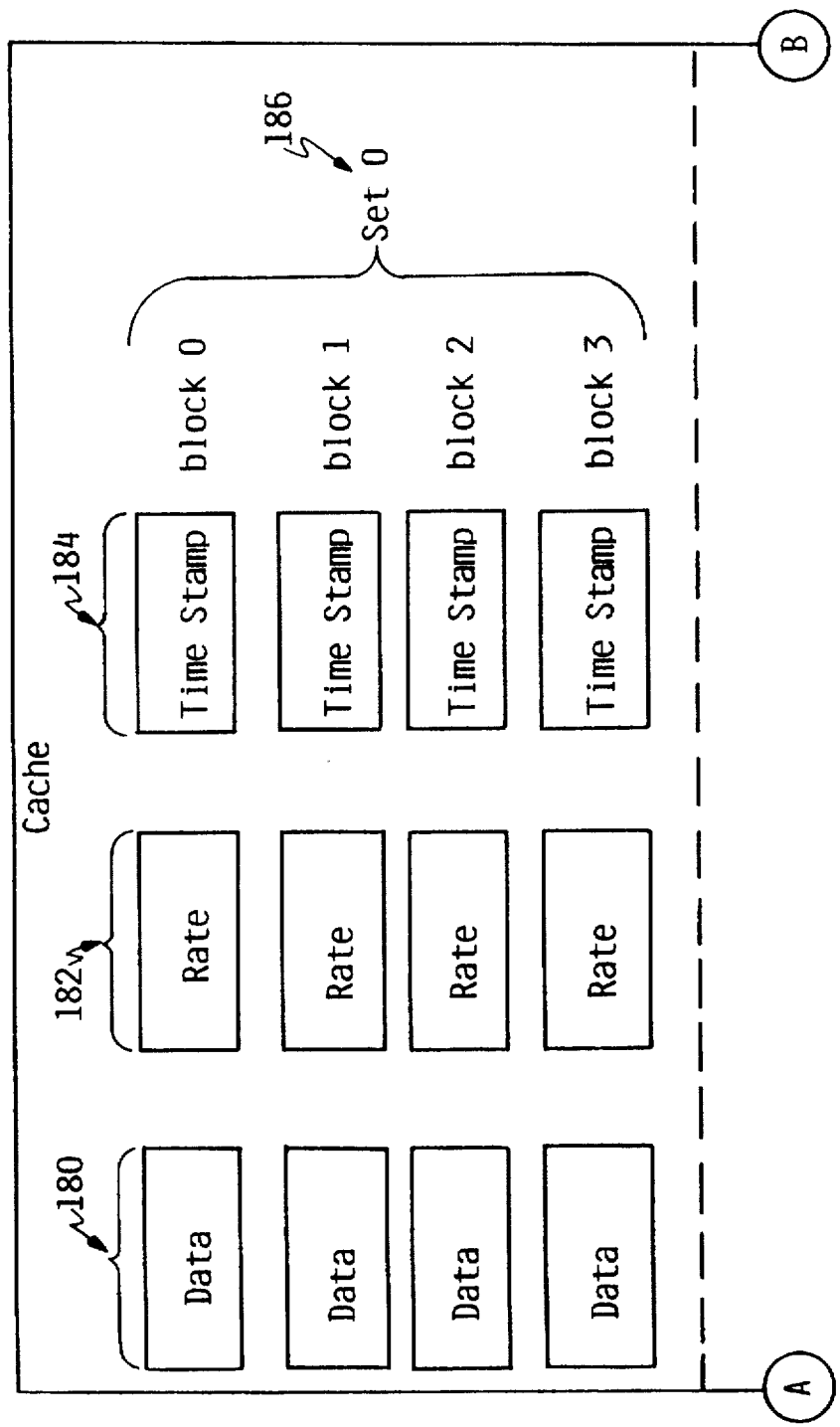
FIG. 6 is a block diagram of a cache, according to the preferred embodiment.
Figure 6B:
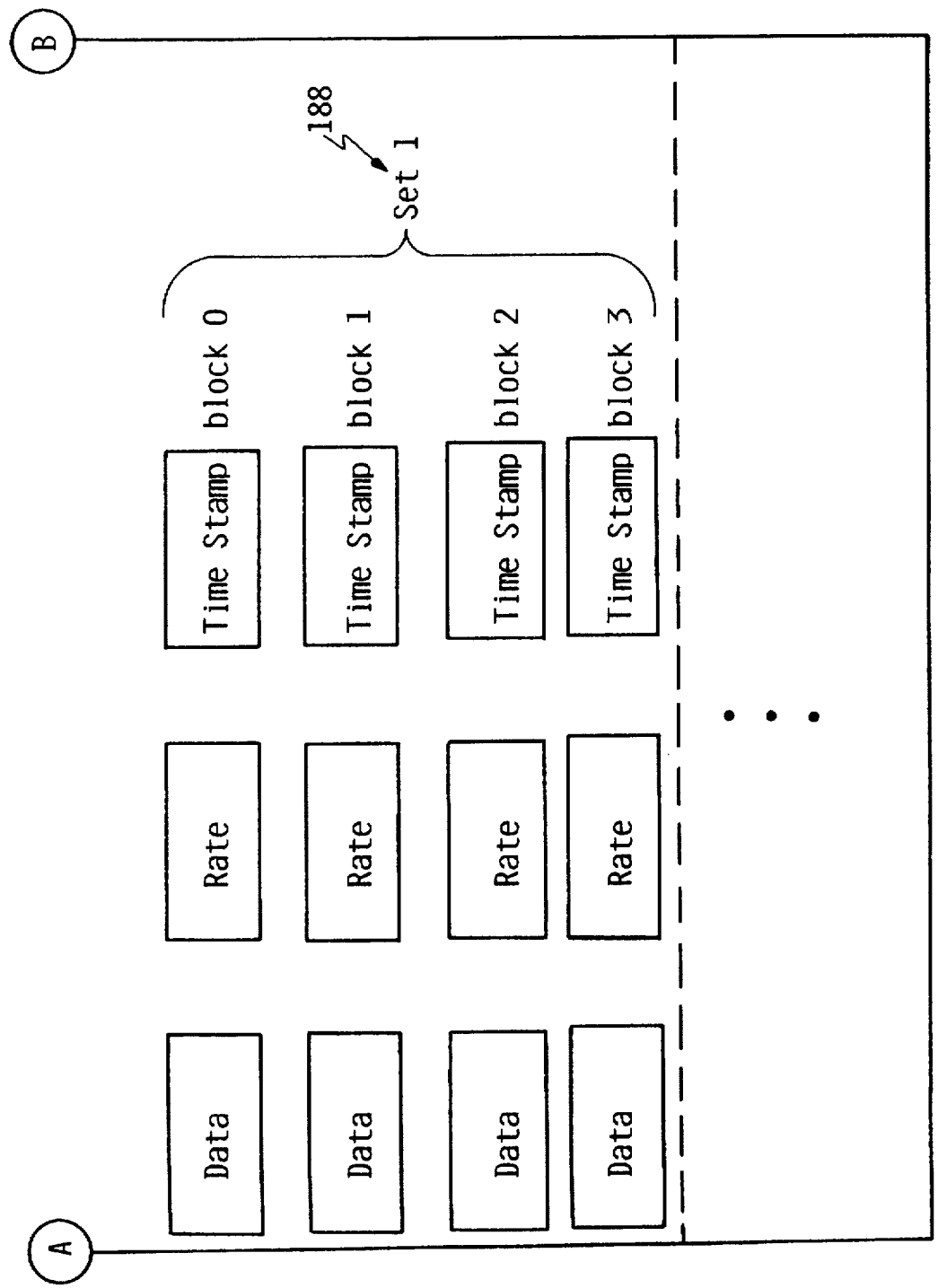
Figure 8:
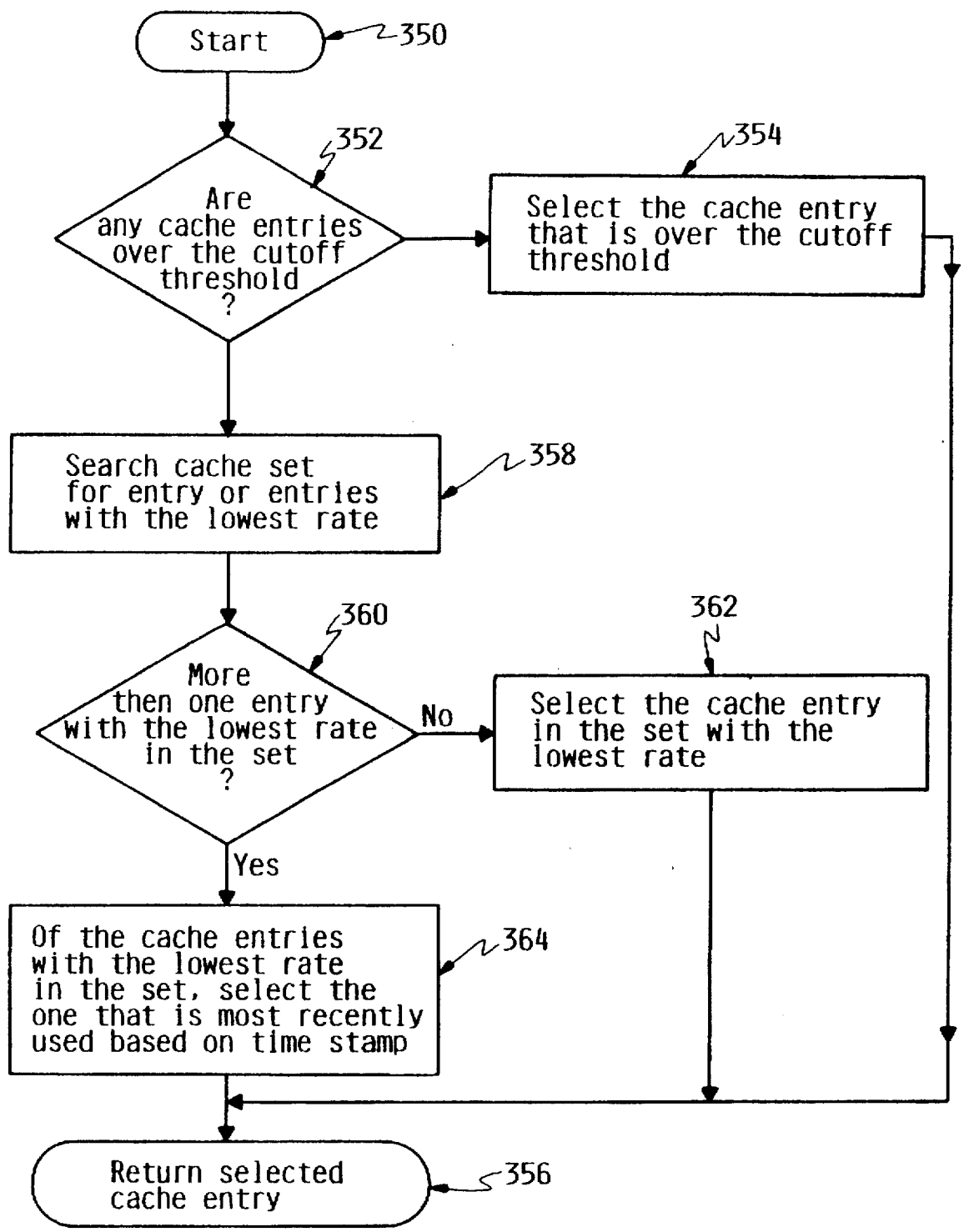
Figure 9:
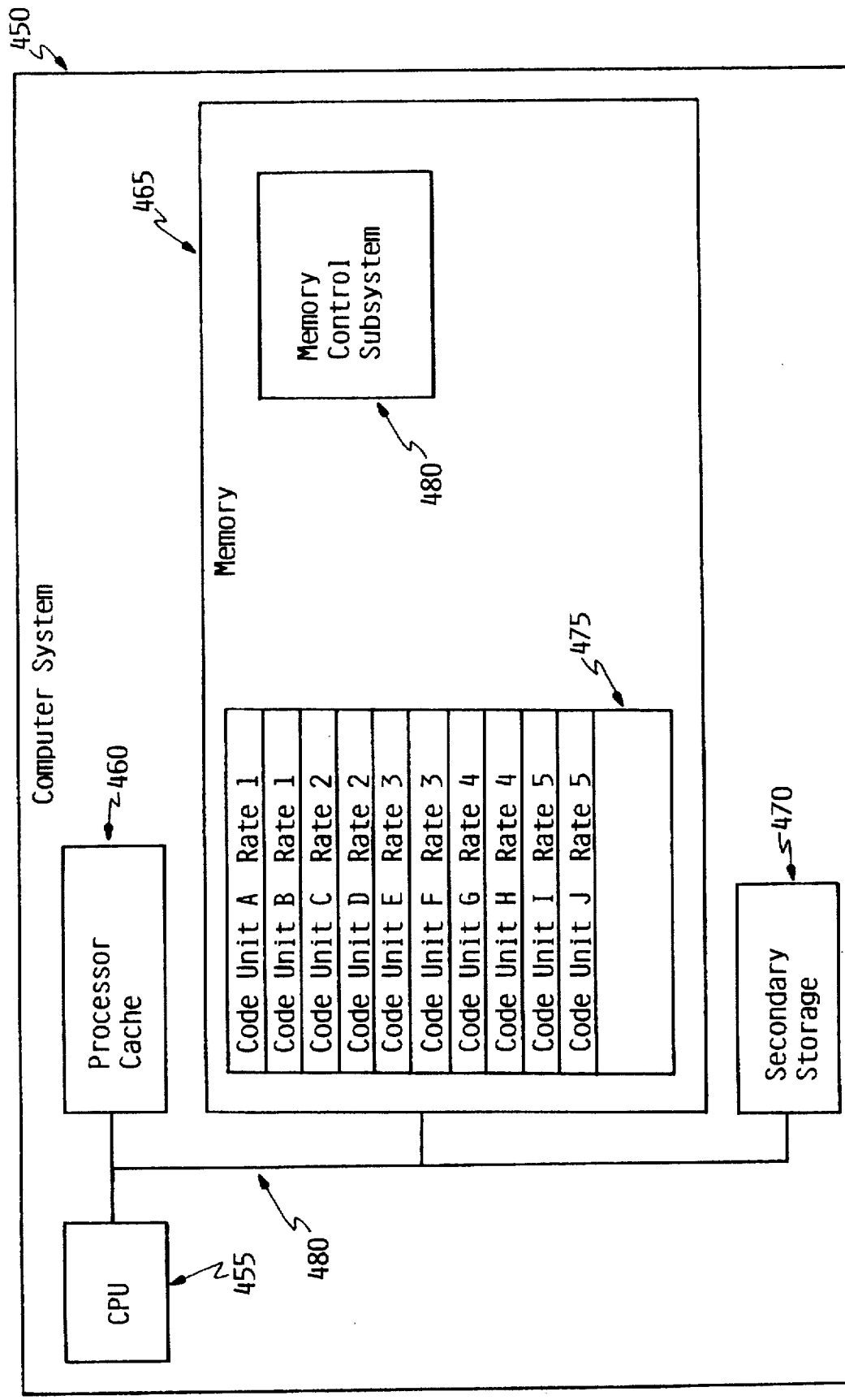
FIG. 9 is a block diagram of an exemplary computer system, according to an alternative embodiment.

FIG. 6 shows a block diagram of an example cache format for TLB 114 of FIG. 5 and processor cache 460 of FIG. 9. In the example shown, the cache has 4-way set associativity with set 0 (186) having four blocks, set 1 (188) having four blocks, and so on. However, the cache could have n-way set associativity, where n is any integer. Each block contains data 180; rate 182 associated with the channel that is the origin or destination of data 180; and time stamp 184, which is the time of the last access of this block. Rate 182 and timestamp 184 will be used by the lowest rate, most recently used mechanism as further described in the flowcharts of FIGS. 7, 8, and 10. In the preferred embodiment, data 180 will contain portions of page tables 116 as further described in the flowcharts of FIGS. 7 and 8. In an alternative embodiment, data 180 will contain portions of code units 475 as further described in the flowcharts of FIGS. 8 and 10.

Figure 7A:
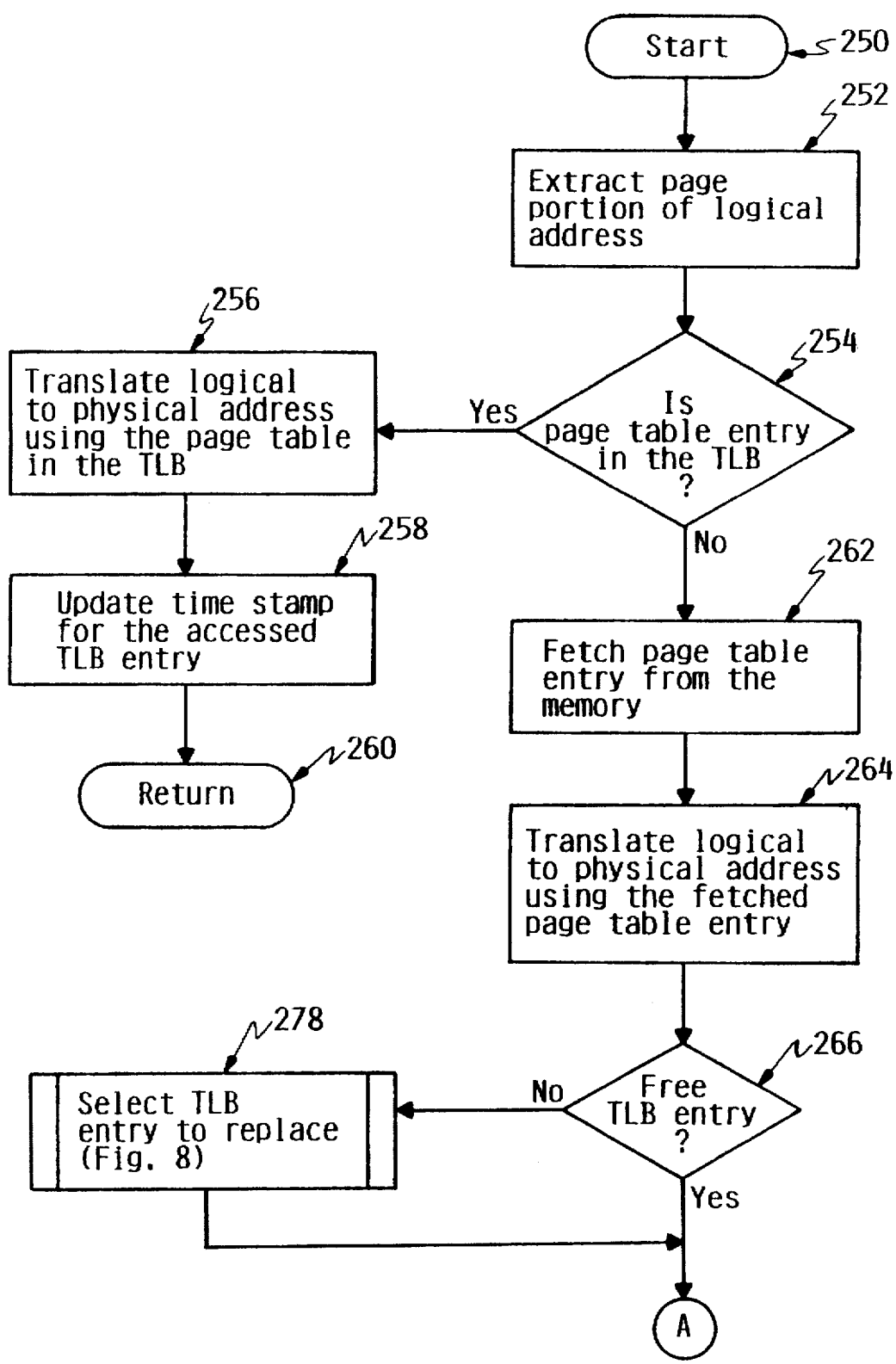
FIGS. 7 and 8 are flowcharts that describe the operation of the preferred embodiment.
Figure 7B:
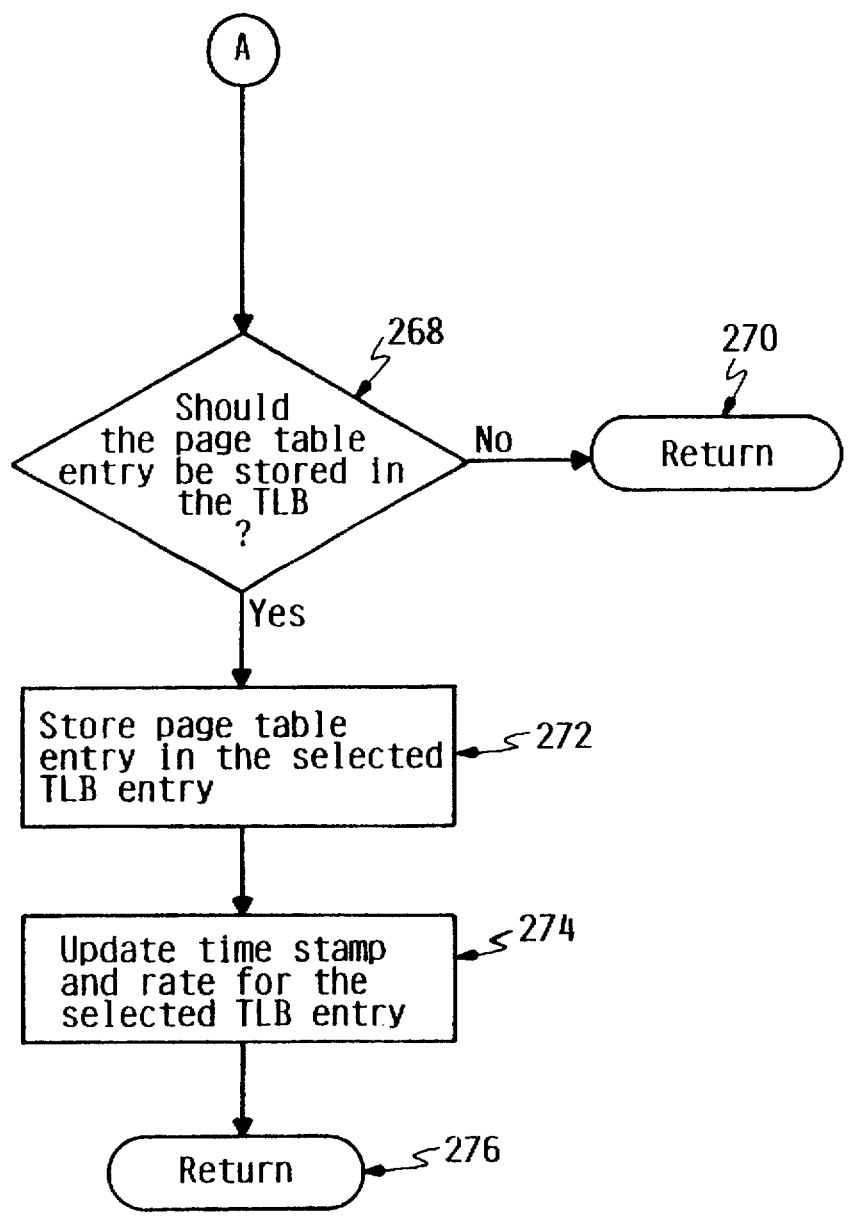

Referring to FIG. 7, at block 250, virtual memory manager 110 starts a process to translate a logical address to a physical address of a piece of data located within data 120. CPU 112 will invoke memory manager 110 whenever it needs to access data 120 for a variety of operations, such as transmitting, receiving, checksumming, encrypting, or compressing data 120.

At block 252, virtual memory manager 110 extracts the page portion of the logical address. At block 254, virtual memory manager 110 checks whether the page table entry associated with the page portion of the logical address is in TLB 114.

When the page table entry is in TLB 114, at block 256 virtual memory manager 110 translates the logical address to a physical address in data 120 using the page table (data 180) in TLB 114. At block 258, virtual memory manager 110 updates time stamp 184 for the accessed TLB block using timer 115. Memory manager 110 then returns to CPU 102 at block 260.

When the page table entry is not in TLB 114, at block 262 virtual memory manager 110 fetches the entry of page table 116 that is associated with the page portion of the logical address that is being translated. At block 264, virtual memory manager 110 translates the logical address to a physical address in data 120 using the fetched page table entry. At block 266, virtual memory manager 110 checks whether TLB 114 has a free block within the set associated with this fetched page table entry. If TLB 114 has a free entry, virtual memory manager 110 checks whether the page table entry should be stored in TLB 114 at block 268. If the page table entry should not be stored in TLB 114, virtual memory manager returns at block 270.

An example of a page table entries that might not be stored in TLB 114 is when the rate associated with the page table entry is much lower than the rates of the current entries in the TLB set because an entry with such a low rate is likely to be swapped out before it would ever be used.

If the page table entry should be stored in TLB 114, virtual memory manager 110 stores the page table entry in the selected TLB entry at block 272, updates time stamp 184 and rate 182 for the selected TLB entry at block 274, and returns at block 276.

When there is not a free TLB entry at block 266, virtual memory manager selects the TLB entry to replace at block 278, as is further described in the flowchart of FIG. 8 and then continues on to block 268 as described above.

Referring to FIG. 8, this flowchart describes the selection of a cache entry based on the lowest rate, most recently used criteria. In the preferred embodiment, the process of FIG. 8 is implemented by virtual memory manager 110. In an alternative embodiment, the process of FIG. 8 is implemented by code unit scheduler 480 of FIG. 9.

Referring again to FIG. 8, the process starts at block 350. At block 352, the process checks whether there are any cache entries in the selected cache set that are over the cutoff threshold. This check can be implemented by the cutoff formula: (timestamp 184)+constant*(rate 182)>=current time. Where "constant" is a predetermined constant greater than 0, and its value is determined for the performance tuning characteristics of the computer system. The constant could be variable as the performance characteristics of the computer system change. If the check at block 352 is true, then the process at block 354 selects the cache entry in the set that is over the cutoff threshold and returns the selected cache entry at block 356. This cache entry is selected because when the cutoff formula is true, then such an entry is a good candidate to be replaced in the cache since it is likely that this entry will not be accessed again in the near future because the activity associated with this channel is not occurring at or near its expected rate.

When there are no cache entries over the cutoff threshold, the process searches the cache set for an entry or entries with the lowest rate 182 at block 358. The process checks whether there is more than one entry in the cache set with the lowest rate at block 360. If there is only one entry with the lowest rate, the process selects the cache entry in the set with the lowest rate for replacement at block 362 and returns that entry at block 356. If there are multiple lowest entries in the set with the same rate 182, then of these lowest rate entries, the process selects the one that is most recently used, i.e., the one with the most recent time stamp 184 and returns this cache entry for replacement at block 356.

FIG. 9 shows a block diagram of an exemplary computer system, according to an alternative embodiment. Computer system 450 contains central processing unit (CPU) 455 connected via system bus 480 to processor cache 460, memory 465, and secondary storage 470. The contents of processor cache 460 are further described in FIG. 6.

Memory 465 contains a plurality of code units 475 and memory control subsystem 480. In this example, there are 10 code units, A–J, each of which has a rate, rate 1–rate 5, associated with it. The code units A–J could represent tasks in computer system 450 that operate at different task priorities, so that the code for each task is executed on CPU 455 at different rates. In another alternative embodiment, the rates of the code units might occur as a result of the structure of object oriented code or as result of running a profiling tool against the code units, which estimates code access patterns.

Figure 10A:
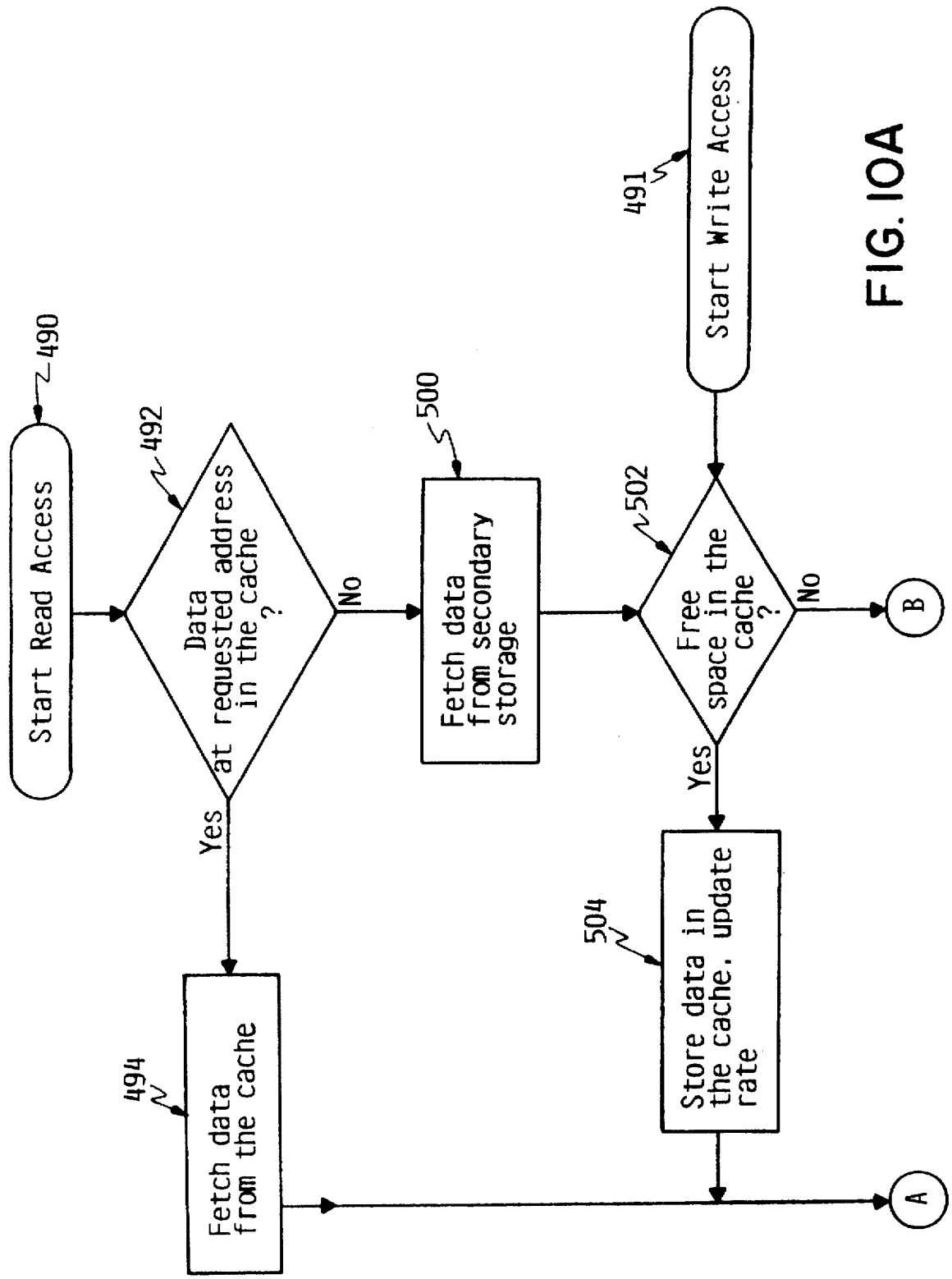
FIG. 10 is flowchart that describes the operation of the preferred embodiment.
Figure 10B:
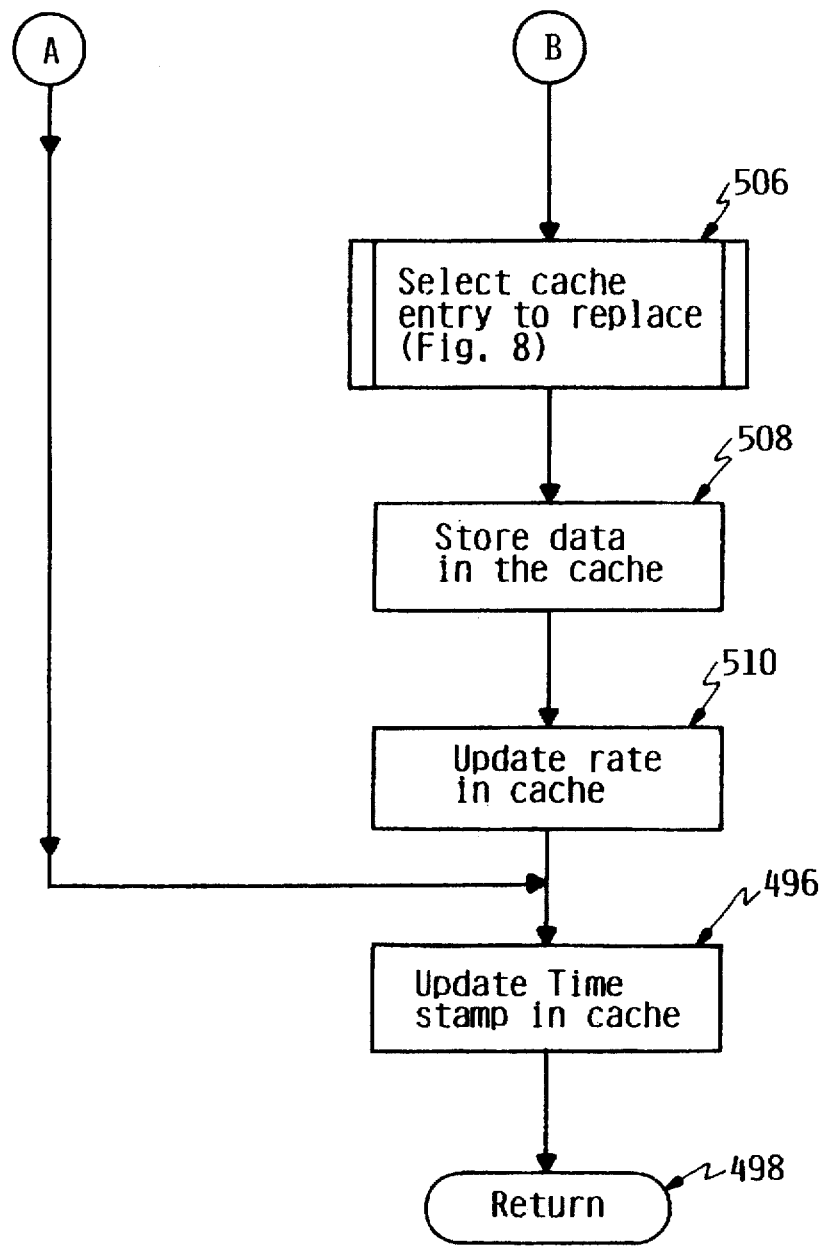

Memory control subsystem 480 comprises a plurality of machine instructions that execute on CPU 455 to carry out this invention as described in more detail in the flowcharts of FIGS. 10 and 8. Memory control subsystem 480 could alternatively be control logic and could be implemented as part of CPU 455 or as a separate component in computer system 450. The contents of memory 465 can be loaded from and stored to secondary storage 470 as needed. In the preferred embodiment, secondary storage 470 is DASD (Direct Access Storage Device). While secondary storage 470 is drawn as a single entity, storage 470 could in fact comprise a plurality of storage devices.

FIG. 10 is flowchart that describes the operation of memory control subsystem 480 as it manages reads and writes to code units 475. Entry for reads by CPU 455 from code units 475 occurs at block 490. At block 492, memory control subsystem 480 checks whether the data requested to be read by CPU 455 is stored in cache 460. If the data at the supplied address is stored in cache 460, then memory control subsystem 480 fetches data 180 from cache 460 at block 494 and updates timestamp 184 to reflect the current time at block 496 before returning at block 498.

If the data at the supplied address is not stored in cache 460, then memory control subsystem 480 fetches the data for the supplied address from secondary storage 470 at block 500 and checks whether there is free space in the cache line associated with the supplied address at block 502. If there is free space in the cache line associated with the supplied address, then memory control subsystem 480 stores the data in cache data 180 and updates rate 182 at block 504 and continues to block 496. If there is not free space in the cache at block 502, then memory control subsystem 480 selects the cache entry to replace at block 506, as further described above in FIG. 8, stores the data in cache data 180 at block 508, and updates rate 182 at block 510 before continuing on to block 496.

Entry for writes by CPU 455 of the data to code unit 475 occurs at block 491.

Figure 11:
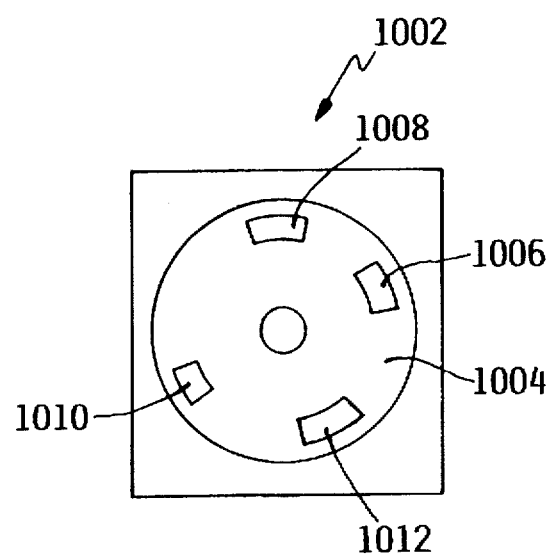
FIG. 11 is a block diagram of an article of manufacture or a computer program product including a storage medium for storing thereon program means for carrying out an alternative embodiment.

FIG. 11 shows an article of manufacture or a computer program product including a storage medium for storing thereon program means for carrying out the method of this invention in the system of FIG. 9. While the present invention has been described in the context of a computer system, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analog communications links.

An example of such an article of manufacture is illustrated in FIG. 11 as pre-recorded floppy disk 1002. Floppy disk 1002 is intended for use with a computer system, and includes magnetic storage medium 1004, and program means 1006, 1008, 1010, and 1012 recorded thereon, for directing memory control subsystem 480 to facilitate the practice of the method of this invention. It will be understood that such apparatus and articles of manufacture also fall within the spirit and scope of this invention.

While this invention has been described with respect to the preferred and alternative embodiments, it will be understood by those skilled in the art that various changes in detail may be made therein without departing from the spirit, scope, and teaching of the invention. Accordingly, the herein disclosed invention is to be limited only as specified in the following claims.

What is claimed is:

1. A method in a computer system that replaces data in a cache, wherein said cache contains a plurality of data blocks, wherein said computer system contains a plurality of channels and each channel has an associated data access rate, comprising the machine executed steps of:

checking whether said cache is full;

when said cache is full, selecting a first data block for replacement in said cache wherein said first data block is associated with and used to process data from a first channel, wherein said first channel has the lowest data access rate of all channels represented in said cache, and wherein said first data block is most recently used of all data blocks associated with said first channel; and replacing said first data block in said cache with a second data block.

2. The method of claim 1, wherein said plurality of channels comprise a plurality of data communication channels, and wherein said rate of access further comprises the rate of data transfer through said plurality of data communications channels.

3. The method of claim 1, wherein said plurality of channels further comprise a plurality of tasks in said computer system wherein each of said tasks has a priority, and wherein said rate of access is based on said priority.

4. The method of claim 1 wherein said plurality of data blocks is contained in a set in said cache.

5. The method of claim 1 wherein said cache is a translation lookaside buffer in a virtual memory system.

6. The method of claim 5 wherein said data blocks are entries in a page control table.

7. The method of claim 1 wherein said selecting step further comprises selecting said first data block based on a cutoff threshold.

8. The method of claim 7 wherein said cutoff threshold further comprises adding a time of last access plus said rate and comparing the result to the current time.

9. An apparatus for replacing data in a cache, in a computer system wherein said computer system contains a plurality of channels and each channel has an associated data access rate, and wherein said cache contains a plurality of data blocks, comprising:

means for checking whether said cache is full;

when said cache is full, means for selecting a first data block for replacement in said cache, wherein said first data block is associated with and used to process data from a first channel, wherein said first channel has the lowest data access rate of all channels represented in said cache, and wherein said first data block is most recently used of all data blocks associated with said first channel; and means for replacing said first data block in said cache with said second data block.

10. The apparatus of claim 9, wherein said plurality of channels comprise a plurality of data communication channels, and wherein said rate of access further comprises the rate of data transfer through said plurality of data communications channels.

11. The apparatus of claim 9, wherein said plurality of channels further comprise a plurality of tasks in said computer system wherein each of said tasks has a priority, and wherein said rate of access is based on said priority.

12. The apparatus of claim 9 wherein said plurality of data blocks is contained in a set in said cache.

13. The apparatus of claim 9 wherein said cache is a translation lookaside buffer in a virtual memory system.

14. The apparatus of claim 13 wherein said data are entries in a page control table.

15. The apparatus of claim 9 wherein said selecting means further comprises selecting said first data block based on a cutoff threshold.

16. The apparatus of claim 15 wherein said cutoff threshold further comprises adding a time of last access plus said rate and comparing the result to the current time.

17. A computer program product for use in a computer system, the computer program product being adapted for replacing data in a cache, wherein said cache contains a plurality of data blocks, and wherein said computer system contains a plurality of channels and each channel has an associated data access rate, the computer program product comprising:

a recording medium;

means, recorded on said recording medium, for checking whether said cache is full;

means, recorded on said recording medium, for selecting, when said cache is full, a first data block for replacement in said cache, wherein said first data block is associated with and used to process data from a first channel, wherein said first channel has the lowest data access rate of all channels represented in said cache wherein said first data block is most recently used of all data blocks associated with said first channel; and means, recorded on said recording medium, for replacing said first data block in said cache with a second data block.

* * * * *